United States Patent [19]
Brandt

[11] 3,849,740
[45] Nov. 19, 1974

[54] INTEGRATED OPTICAL AND/OR GATE
[75] Inventor: Gerald B. Brandt, Pittsburgh, Pa.
[73] Assignee: Westinghouse Electric Corporation, Pittsburgh, Pa.
[22] Filed: May 1, 1973
[21] Appl. No.: 356,237

[52] U.S. Cl.. 331/94.5 C, 331/94.5 A, 350/96 WG, 307/88 LC, 307/203, 307/207
[51] Int. Cl.............................................. H01s 3/05
[58] Field of Search.................... 331/94.5; 330/4.3; 350/96 WG; 307/88 LC, 203, 207

[56]         References Cited
         UNITED STATES PATENTS
3,408,131  10/1968  Kapany...................... 331/94.5 X OTHER PUBLICATIONS
Marcatilli, Bell System Journal, Vol. 48, No. 7, Sept. 1969, pp. 2103–2106.

Primary Examiner—Ronald L. Wibert
Assistant Examiner—R. J. Webster
Attorney, Agent, or Firm—D. Schron

[57]           ABSTRACT

An integrated thin-film optical logic gate comprising a first and second optical input waveguide coupled to a laser active film. The laser active film includes an optical feedback means coupled to an output optical waveguide. The laser active film has a threshold energy level above the coupled energy of either the input waveguides, but below that of the coupled energy of both inputs in the AND mode, and a threshold energy below the energy coupled from either input waveguide in the OR mode.

8 Claims, 4 Drawing Figures

INTEGRATED OPTICAL AND/OR GATE

FIELD OF THE INVENTION

The present invention relates to an integrated optical logic device, and in particular, to an integrated thin-film optical AND/OR gate.

BACKGROUND OF THE INVENTION

While the underlying physical phenomena has been known for many years, thin-film optical waveguides are of recent origin. Optical waveguides, particularly integrated optics — a plurality of optical components on a monolithic structure — offer major promise in signal processing and communication. The thin-film optical waveguide system usually comprises a dielectric or semiconductor film deposited upon a substrate. Light which is coupled into the film, adapts itself so that the beam is confined within the thickness of the film structure. The wavelength of the guided light wave, and therefore its propagation constant, is a function of the dimension and indices of refraction of the waveguide and adjacent materials. In order for propagation to occur within the guide, the index of refraction for the guided material must be greater than the indices of refraction of the material bounding the guide. Furthermore, the continuity of the light wave and its spatial derivatives at the boundary surface of the guide control the allowed wavelengths in the guide as well as the evanescent wave region where the wave exponentially decreases in amplitude. Because of the small size of optical waveguides, optical energy is generally not directly coupled into the guide. Prisms and gratings are utilized, therefore, for evanescent wave coupling of optical energy.

Many passive as well as active integrated optical components have been proposed. Active devices, however, have been limited to externally operated modulators or amplifiers. For example, digital electro-optical deflectors have been constructed in which periodic electrode patterns are used to generate voltage-controlled phase gratings in an electro-optic waveguide. Acousto-optic effects have also been demonstrated as useful in modulation and deflection. An acousto-optical device has been demonstrated in which ultrasonic acoustic bulk waves passing through a waveguide are used for interaction with propagated light to provide wide bandwidth modulation thereof. Other devices have also been demonstrated which greatly expand the usefulness of optical signal processing and communication.

It is an object of the present invention to provide a novel means for performing optical computing logic functions. A further object of the invention is to provide an integrated optical AND/OR logic device for use in optical signal processing, optical control devices, and the like.

SUMMARY OF THE INVENTION

The present invention provides a thin-film optical logic device for performing AND or OR operations. Generally, the present invention comprises at least two thin-film input waveguides evanescently coupled to a laser active media. The laser active medium is designed to provide optical feedback, for example, having integrated mirrors or a feedback loop. A third thin-film optical waveguide is coupled to the laser active medium to provide an output signal when the laser active medium is pumped above threshold.

In the AND mode, the laser active medium has a threshold energy level above the evanescently coupled energy of either of the input waveguides, but below that of the energy coupled from both input guides. Thus, when light beams are propagated through both input waveguides simultaneously, the threshold energy of the laser active medium is surpassed and laser energy is pumped by means of the optical feedback to couple light through the output waveguide. In the OR mode, the threshold energy of the laser active medium is below the energy coupled from either input waveguides through which a light beam is propagated. Thus, light propagating through either input waveguide is sufficient to pump the laser active medium above threshold and couple optical energy through the output waveguide. The sensitivity may be increased by additional pumping from a source outside of the waveguides and the logical operation can be changed from logical AND to logical OR by pumping with a bias near threshold.

Generally, the integrated optical logic device of the present invention comprises a substrate of low refractive index upon which a first thin-film input waveguide of higher refractive index is deposited. Over the first input waveguide, is deposited a low refractive index coupling material upon which the laser active medium is deposited. The laser active medium is, for example, a rhodamine 6G doped polymer film. The film includes integrated mirrors and an output waveguide coupled thereto. Over the laser active medium is deposited a low refractive index material for supporting and coupling a second input waveguide. The first and second input waveguides of the device are thus evanescently coupled to the laser active medium.

The device is not restricted to planar construction, however, and may take other forms. Optionally, the laser active medium may take the form of a closed loop either within or without the plane of the device coupled to the first and second input waveguides and an output waveguide. The closed loop configuration eliminates the requirement for integrated reflecting means because the loop itself provides optical feedback. Other advantages of the present invention become apparent from the following detailed description of the presently preferred embodiments taken in connection with the accompanying drawings.

PRESENTLY PREFERRED EMBODIMENTS

Figure 1:
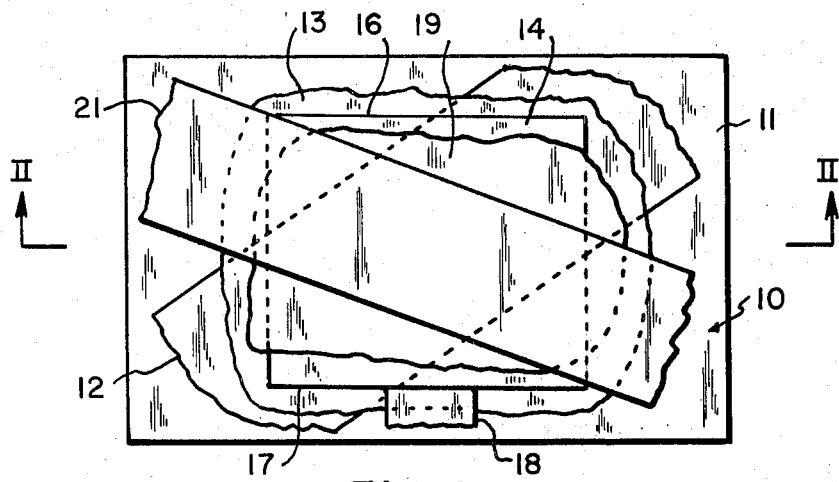
FIG. 1 is a plan view of an integrated optical AND/OR gate of the present invention.
Figure 2:
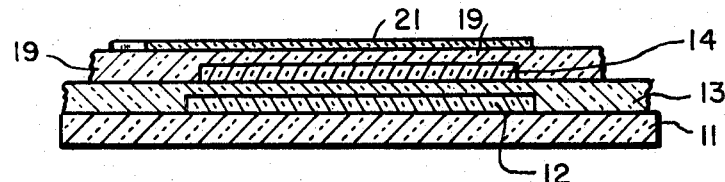
FIG. 2 is a section taken along line II—II of FIG. 1.

Referring to FIGS. 1 and 2, an integrated optical gate 10 of the present invention is mounted on substrate 11 such as Pyrex glass or other material having a low index of refraction. A first input waveguide 12 is deposited on substrate 11, preferably by sputtering a glass such as Corning 7059 or other material having an index of refraction greater than substrate 11. Waveguide 12 has a thickness of from about one to 10 times the wavelength of the desired light frequency. Typically this is from about 1.0 microns to 8.0 microns depending upon the range of the range of the spectrum desired. The thickness however, is preferably not more than about 10 wavelengths. Waveguide 12 is preferably sputtered to substrate 11 utilizing a mask to obtain a longitudinal configuration as shown in FIG. 1. Longitudinal configuration is preferred to optimize the optical energy available to pump the laser active medium.

Over waveguide 12 is deposited a low refractive index coupling material 13 such as a polymeric film or Pyrex glass. Material 13 must have an index of refraction less than waveguide 12 and should be of a thickness less than about one wavelength, and preferably about λ/4 to provide an evanescent coupling between waveguide 12 and laser active material 14.

Laser active material 14 is preferably a rhodamine 6G doped polymeric film such as polyurethane or the like. Other materials suitable for use in the present invention include neodymium ions in glass, holmium ions in glass or any other laser ion having a reasonable gain in crystalline or glass host materials. Laser active medium 14 is deposited directly on coupling material or film 13 to overlie waveguide 12. Laser active medium 14 has a thickness of about λ/4 to λ in the region bounded by the input waveguides and the host material of medium 14 may be increased in thickness at its unbounded edges to support sputtered mirrors 16 and 17. Mirrors 16 and 17 provide one means of optical feedback wherein mirror 16 is preferably totally reflective and mirror 17 permits partial coupling with output waveguide 18 which is preferably a continuum of the host material of medium 14. That is, output waveguide 18 is in the same plane as laser medium 14 and is directly coupled thereto.

Preferable alternatives to integrated mirrors for obtaining the required feedback include periodic structures deposited on the surface of the host material of medium 14, such as gratings, or by means of distributive feedback. Distributive feedback can be achieved by periodic placement of the laser dye or ions in the host material which is optically equivalent to mirrors 16 and 17. Also by pumping monochromatic light of the same frequency into waveguides 12 and 21 an interference pattern is established which is dependent upon the angles of the two waveguides. That is, the spacing of the pattern is determined by the angle between waveguides 12 and 21, and feedback for the laser pump light is achieved at the high interference regions. See generally, 18 Applied Phys. Letters 152, 395 (1971).

A low refractive index coupling material 19 is deposited over laser active medium 14 and output waveguide 18. The index of refraction is less than waveguide 21 which is deposited over coupling material 19. Coupling material 19 is of a thickness less than one wavelength and preferably about one-fourth wavelength. Alternatively, waveguide 18 could be deposited on coupling material 19 to provide a suitable output coupling from laser active medium 14.

The doping of laser active medium 14 for AND mode operation is sufficient to provide a threshold below the combined energy coupling from optical energy propagating simultaneously through waveguides 12 and 21. The threshold, however, is below that of either coupling energy alone. By adjusting the threshold to a level close to the optical energy of a single beam coupled evanescently to the laser active medium 14, the OR mode can be achieved.

Figure 3:
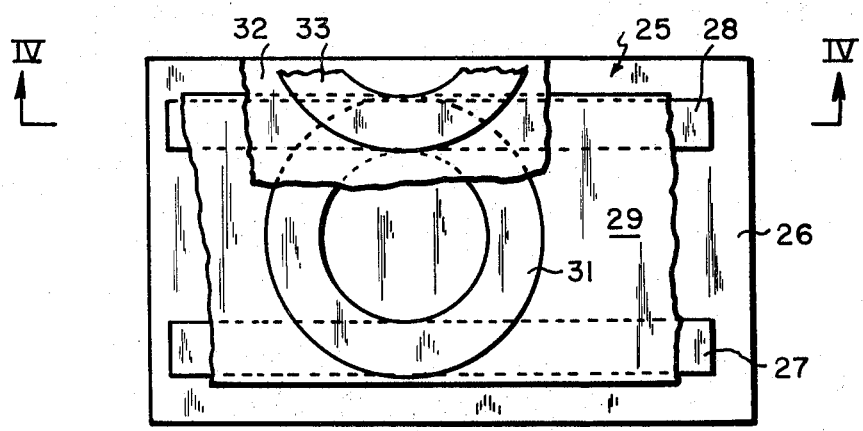
FIG. 3 is a plan view of an integrated optical AND/OR gate utilizing a closed loop laser active medium.
Figure 4:
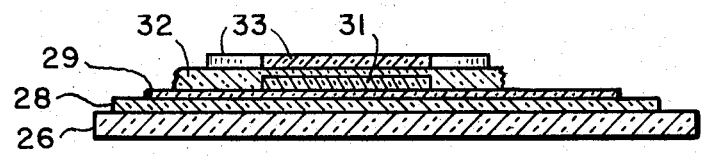
FIG. 4 is a section taken along line IV—IV of FIG. 2.

Referring to FIGS. 3 and 4, another embodiment of the present invention comprises an optical AND/OR gate 25. Gate 25 is mounted on substrate 26 having a low index of refraction. Logic gate 25 comprises an output waveguide 27 and a first input waveguide 28 deposited on substrate 26. First waveguide 28 and output waveguide 27 are preferably deposited by means of sputtering glass through a mask overlying substrate 26. Deposited over waveguides 27 and 28 is coupling film 29 having a low index of refraction for supporting an evanescent field. Deposited over evanescent field coupling film 29 is circular laser active medium 31. Laser active medium 31 is deposited as a ring configuration having portions overlying waveguide 28 and output waveguide 27. Deposited over ring 31 of laser active material is an evanescent field coupling material 32 upon which second input waveguide 33 is deposited to overlie first waveguide 28 and a portion of ring 31. Laser active material is doped within the area bounded between waveguides 28 and 33.

While the laser active medium 31 is shown in the plane of the device, the optical feedback circuit is not restricted to a planar configuration. The operation of gate 25 is the same as device 10.

While the present invention has been described with reference to presently preferred embodiments, it may otherwise be embodied within the scope of the present claims.

What is claimed is:

1. A thin film optical logic device comprising:
first and second optical waveguides for propagating optical energy at predetermined levels; a laser resonator including an active laser medium; means for positioning said laser medium close enough for evanescent coupling of optical energy propagating through said waveguides into said laser medium; said laser medium having a lasing threshold below the energy level of that optical energy coupled via at least one of said evanescent couplings; and an output waveguide positioned with respect to said laser medium for coupling into said output waveguide optical energy from said laser medium.

2. An optical logic device as set forth in claim 1 wherein said laser resonator comprises a pair of mirrors integrated with the said laser medium.

3. An optical logic device as set forth in claim 1 wherein resonator is a ring resonator.

4. A thin film optical logic device comprising:
first and second optical waveguides angularly offset with respect to each other for propagating optical energy at predetermined levels; a laser resonator including an active laser medium; means for positioning said laser medium close enough for evanescent coupling of monochromatic light of the same frequency propagating through said waveguides into said laser medium; said laser medium having a lasing threshold below the energy level of that optical energy coupled via at least one of said evanescent couplings; and an output waveguide positioned with respect to said laser medium for coupling into said output waveguide optical energy from said laser medium.

5. An optical logic device as set forth in claim 1 wherein said laser medium has a lasing threshold greater than the energy level of each of said evanescent couplings and below the combined energy level of said evanescent couplings.

6. An optical logic device as set forth in claim 4 wherein said laser medium has a lasing threshold greater than the energy level of each of said evanescent couplings and below the combined energy level of said evanescent couplings.

7. An optical logic device as set forth in claim 1 wherein said output waveguide comprises a portion of said laser medium.

8. An optical logic device as set forth in claim 4 wherein said laser medium comprises a host material selected from the group consisting of glass and transparent crystalline material and films and including active laser ions and dyes, respectively, doped in the region bounded by said first and second waveguides and wherein said output waveguide comprises a part of said host material.

* * * * *